United States Patent
Walter

(10) Patent No.: US 7,513,711 B1
(45) Date of Patent: Apr. 7, 2009

(54) ARTIFICIAL MARINE REEF INDUCEMENT STRUCTURE

(76) Inventor: David Walter, P.O. Box 998, Orange Beach, AL (US) 36561

( * ) Notice: Subject to any disclaimer, the term of this patent is extended or adjusted under 35 U.S.C. 154(b) by 94 days.

(21) Appl. No.: 11/620,000

(22) Filed: Jan. 4, 2007

(51) Int. Cl.
*A01B 61/00* (2006.01)
(52) U.S. Cl. .......................... 405/25; 119/221
(58) Field of Classification Search ............ 45/21, 45/25, 30
See application file for complete search history.

(56) References Cited

U.S. PATENT DOCUMENTS 3,704,687 A * 12/1972 Nohmura ............. 119/221
5,173,006 A * 12/1992 Lowe ..................... 405/25
6,186,702 B1 * 2/2001 Bartkowski ............. 405/25
6,824,327 B1 * 11/2004 Walter ................... 405/33
7,024,735 B1 * 4/2006 Huggins ................... 27/1

OTHER PUBLICATIONS

Wentzley, Suzanne; St. Lucie inlet reef under watchful eyes; Jan. 2004; www.cdnn.info/eco/e040104/e040104.html.*

* cited by examiner

*Primary Examiner*—John Kreck
(74) *Attorney, Agent, or Firm*—Michael I. Kroll

(57) ABSTRACT

A structure that can be made in many different shapes composed of primarily soft limestone slabs and formed in a manner to a frame whereby ample surface area is provided for securement thereon of crustaceans, coral and other aquatic life. Additionally the present invention includes a base portion to support the present invention and handles or straps to assist in placement of the device in the ocean.

12 Claims, 7 Drawing Sheets

ARTIFICIAL MARINE REEF INDUCEMENT STRUCTURE

BACKGROUND OF THE INVENTION

Field of the Invention

The present invention relates generally to oceanic reefs and, more specifically, to the creation, enhancing or expansion of oceanic reefs by the formation and placement of a plurality of differently shaped structures formed of a frame, typically tetrahedron shaped conjoined with a plurality of slabs forming the majority of the device's surface. The slabs are manufactured of concrete which forms a plate for embedding rocks, such as soft limestone or other indigenous rocks that allow marine animals to burrow.

The present invention functions to promote the formation of an oceanic reef by providing ample surface area formed of soft limestone providing an area for marine wildlife to anchor themselves to enable the start of an oceanic life cycle with an increased fish populace.

While there are other devices for creating an artificial oceanic reef that may be suitable for the purposes for which they were designed, they would not be as suitable for the purposes of the present invention, as hereinafter described.

SUMMARY OF THE PRESENT INVENTION

A primary object of the present invention is to provide a block-like structure composed of primarily soft limestone utilized for the development of artificial oceanic reefs.

Another object of the present invention is to provide a block-like structure having a formed extending surface area ideal for the attachment thereto of crustaceans and other aquatic life forms.

Yet another object of the present invention is to provide a block-like structure having a frame with attachable slabs of soft limestone to provide an easily attachable environment for ocean life Still yet another object of the present invention is to provide a block-like structure having loops and attachments to help facilitate in placing of the present invention.

Another object of the present invention is to provide a block-like structure that may be constructed having a base portion to support the device when placed.

Additional objects of the present invention will appear as the description proceeds.

The present invention overcomes the shortcomings of the prior art by providing a block-like structure that can be made in many different shapes composed of primarily soft limestone slabs and formed in a manner to a frame whereby ample surface area is provided for securement thereon of crustaceans, coral and other aquatic life. Additionally the present invention includes a base portion to support the present invention and handles or straps to assist in placement of the device in the ocean.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
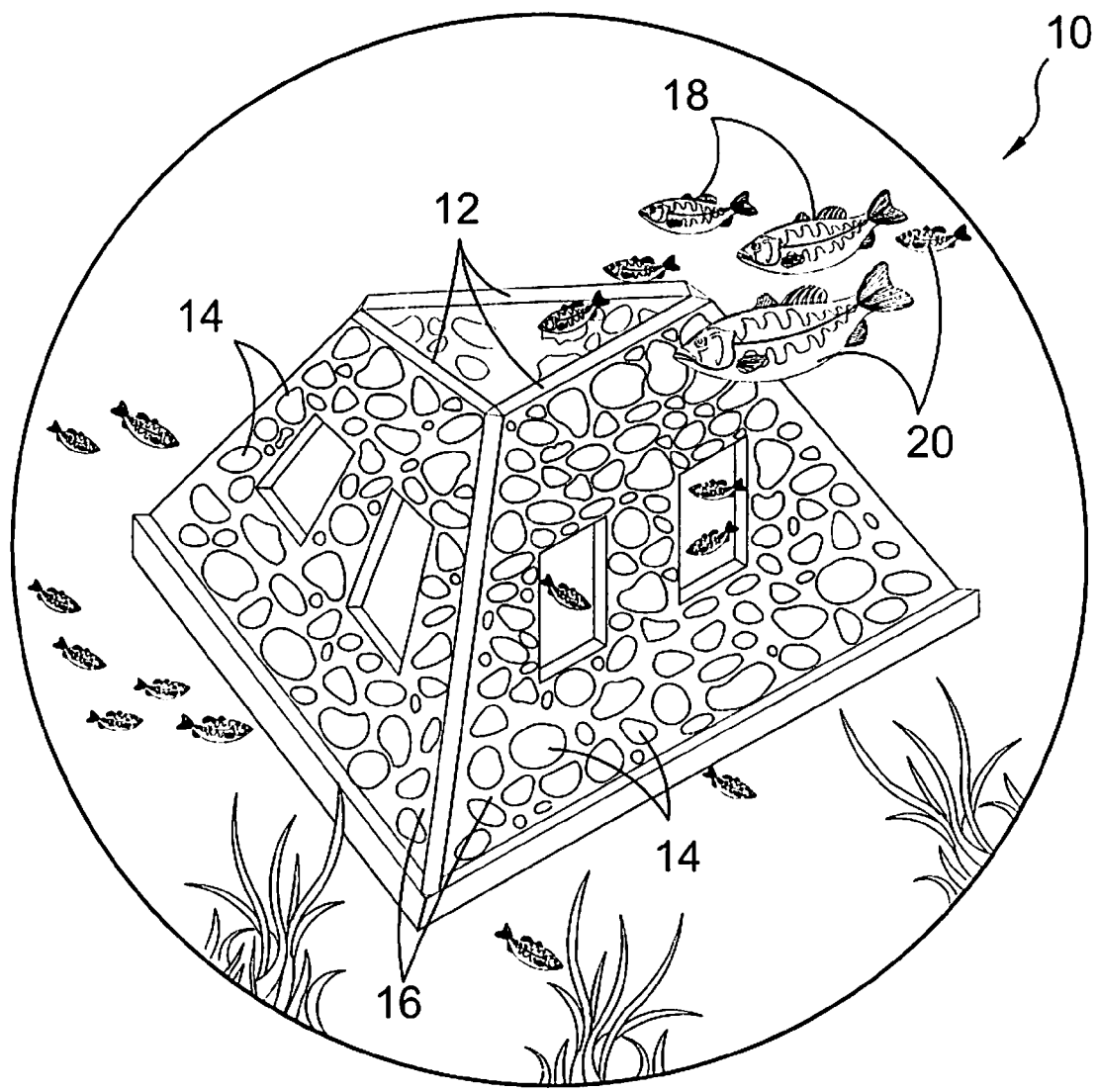
FIG. 1 is an illustrative view of the present invention in use.

Turning now descriptively to the drawings, in which similar reference characters denote similar elements throughout the several views, the figures illustrate the Artificial Reef of the present invention. With regard to the reference numerals used, the following numbering is used throughout the various drawing figures.

10 Artificial Reef of the present invention
12 support structure
14 soft stone
16 concrete
18 marine life
20 fish
22 base of 12
24 frame member of 12
26 interior of 12
28 recess of 16
30 boring marine animals
32 coquina (south Florida limestone)
34 crustaceans
36 worms
38 coral
40 cylindrical reef
42 footpads of 40
44 center post of 40
46 hoist bar
48 pyramid-shaped reef with square footprint
50 square reef

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention is an artificial reef 10 having a manufactured support structure 12 in a plurality of shapes. Rock, such as Florida or other soft limestone 14, soft limestone 14 is excellent reef material and is embedded into concrete walls 16 assembled about the support structure 12. The added benefit of embedding the stone 14 in the concrete 16 reef is to allow vertical relief from the bottom. This exposes more of the stone 14 for marine life 18 to attach itself to. By using small stones 14 instead of one large stone 14, much more surface area is exposed for the marine life 18 to attach to. The stone 14 allows marine boring animals (worms) and other marine life forms 18 such as crustaceans to drill into the stone 14 for easy attachment, attracting fish 20 and other marine life 18 to the artificial reef 10.

Figure 2:
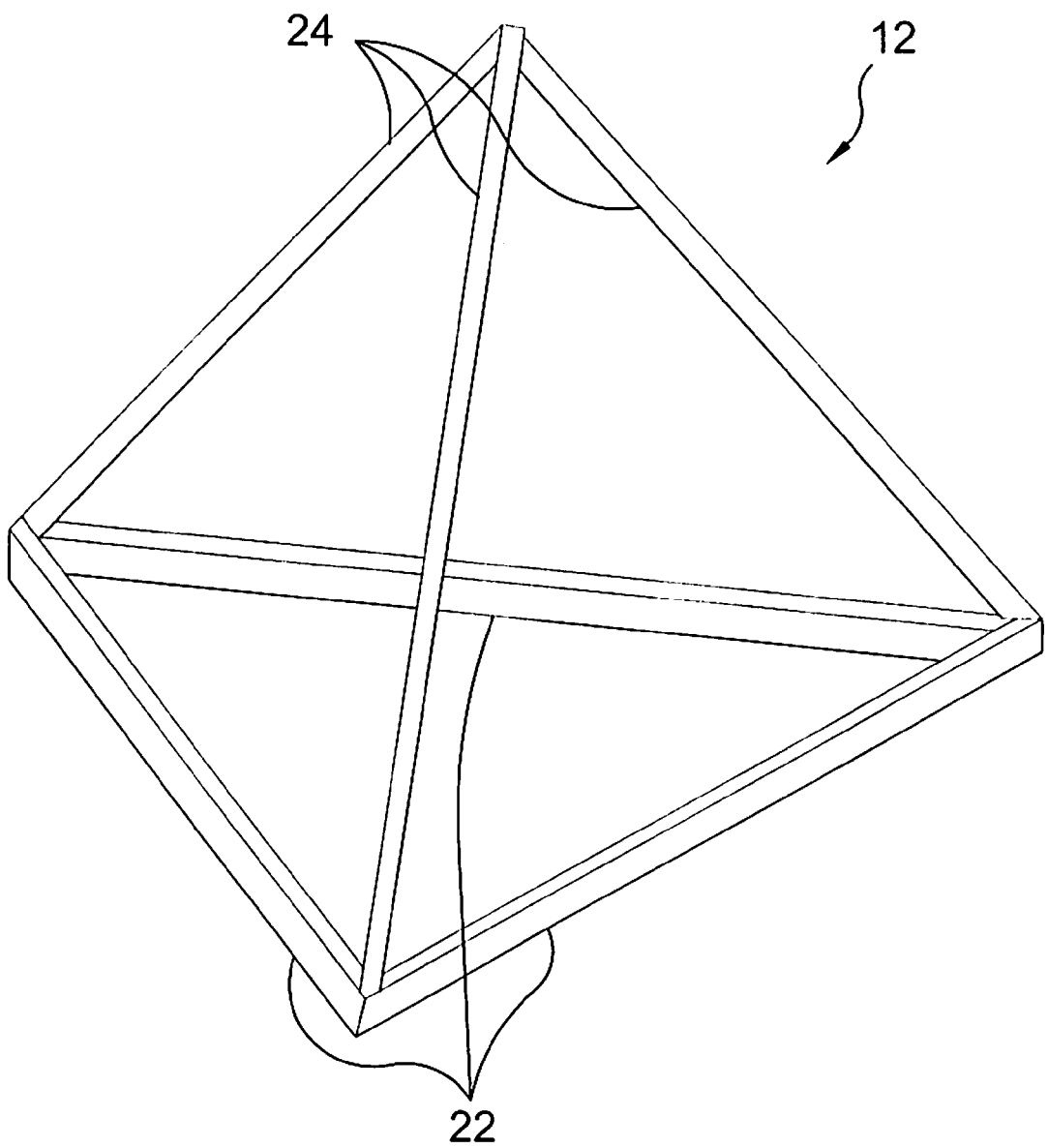
FIG. 2 is a perspectives view of a support structure of the present invention.

FIG. 2 is a perspectives view of a support structure 12 of the present invention. Shown is a support structure 12 of the present invention's artificial reef having a manufactured support structure 12 in a plurality of shapes and rock types, such as soft limestone that is an excellent reef material, embedded into concrete walls assembled about the support structure 12. The added benefit of embedding the stone in the concrete is to allow vertical relief from the base 22. Frame members 24 extend from the base 22 to support the concrete walls. This exposes more of the soft stone for marine life to attach itself to. By using small stones instead of one large stone, much more surface area is exposed for the marine life to attach to.

Figure 3:
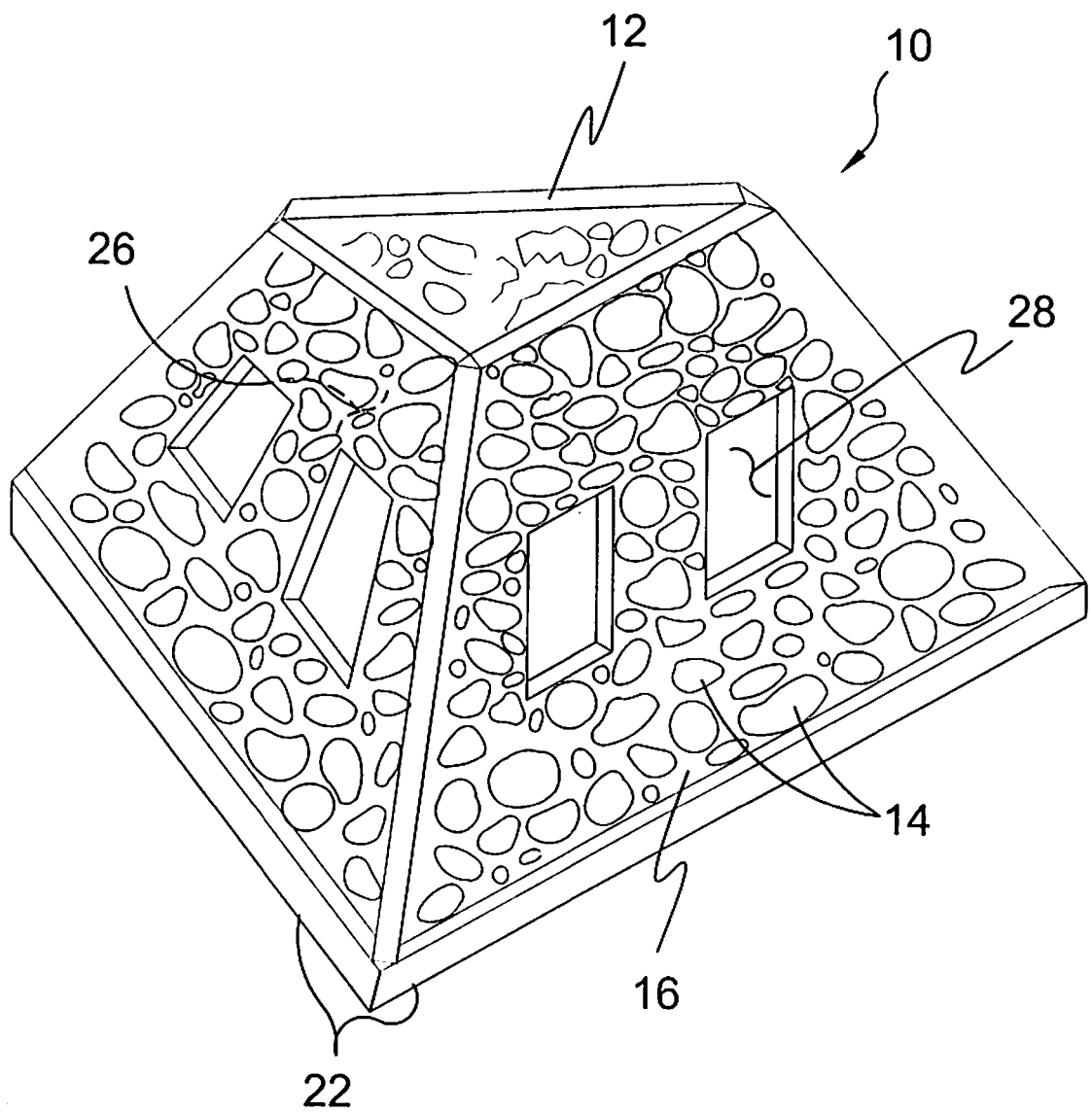
FIG. 3 is a perspective view of the present invention.

FIG. 3 is a perspective view of the present invention 10. Shown is the artificial reef 10 comprising a manufactured support structure 12 in a plurality of shapes and soft rock types 16 that are embedded into concrete walls 16 assembled about the frame members 24 of the support structure 12. The benefit of embedding the soft stone 14 in the concrete walls 16 is to allow vertical relief from the base 22. This exposes more of the soft stone 14 for marine life to attach itself to. By using small stones 14 instead of one large stone 14, much more surface area is exposed for the marine life to attach to. The soft limestone 14 allows marine boring animals (worms) and other marine life forms such as crustaceans to drill into the stone 14 for easy attachment, attracting fish and other marine life to the artificial reef 10. The interior 26 of the reef 10 is substantially hollow and accessible through a plurality of recesses 28 disposed within the walls 16 thereof.

Figure 4:
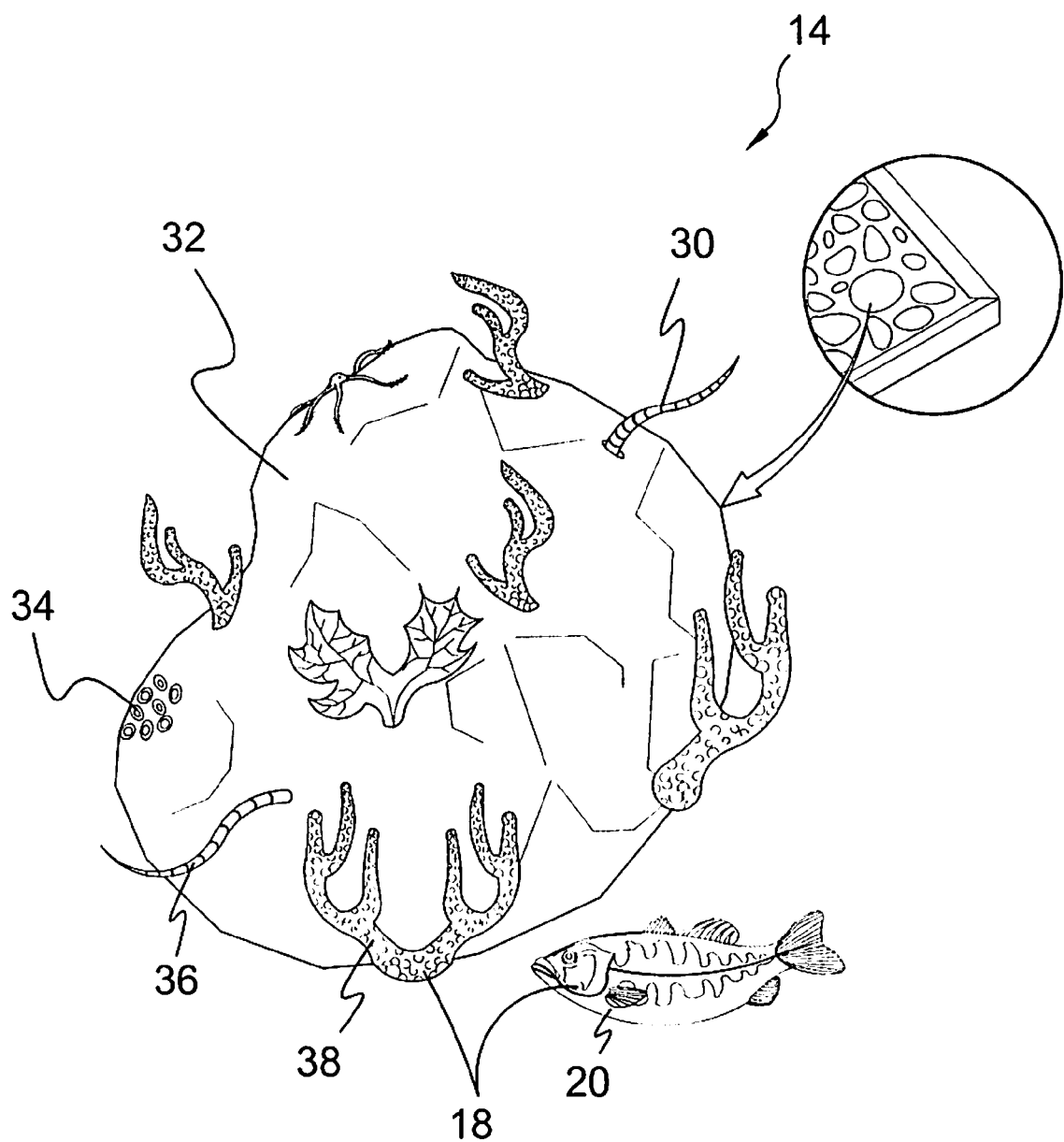
FIG. 4 is a detailed view of the present invention.

FIG. 4 is a detailed view of the soft rock 14. Shown is one example of the soft rock 14 used in the support structure. As illustrated, soft rock 14 such as coquina (south Florida limestone) 32 or other soft limestone 14 is excellent reef material and is embedded into concrete walls assembled about the support structure. The soft rock 14 allows marine boring animals 30 such as worms 36 and crustaceans 34 to drill into the stone 14 for easy attachment, attracting fish 20, coral 38 and other marine life 18 to the artificial reef.

Figure 5:
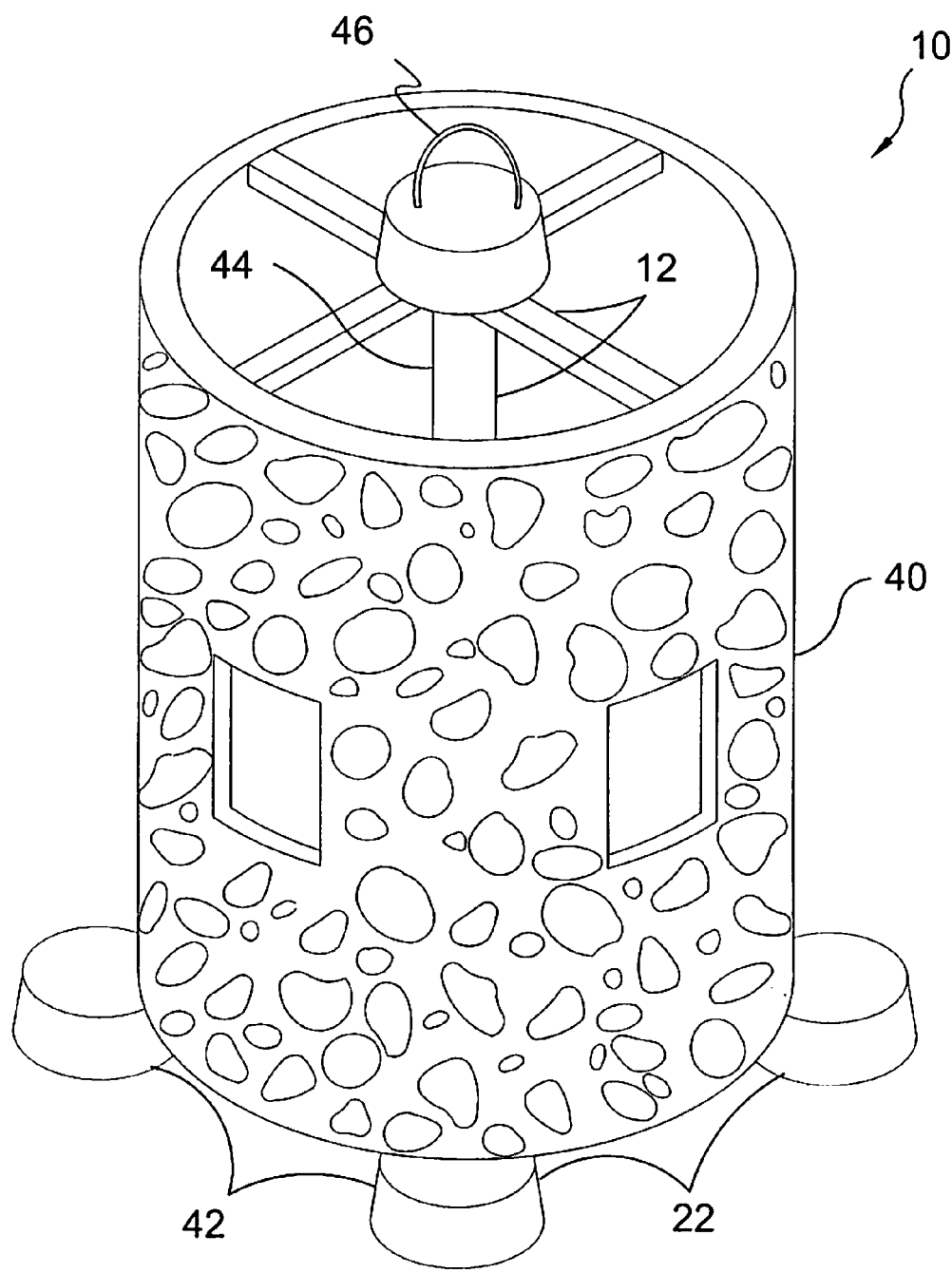
FIG. 5 is a perspective view of an alternate shape of the present invention.

FIG. 5 is a perspective view of an alternate shape of the present invention 10. The present invention 10 can be fabricated in any shape without deviating from the objectives thereof. Shown is a cylindrical reef 40 having a support structure 12 with foot pads 42 as a base 22 and frame members 24 including a center post 44 with spoke-like members emanating therefrom. A hoist bar 46 is disposed on the top of the center post 44 to assist in the installation thereof.

Figure 6:
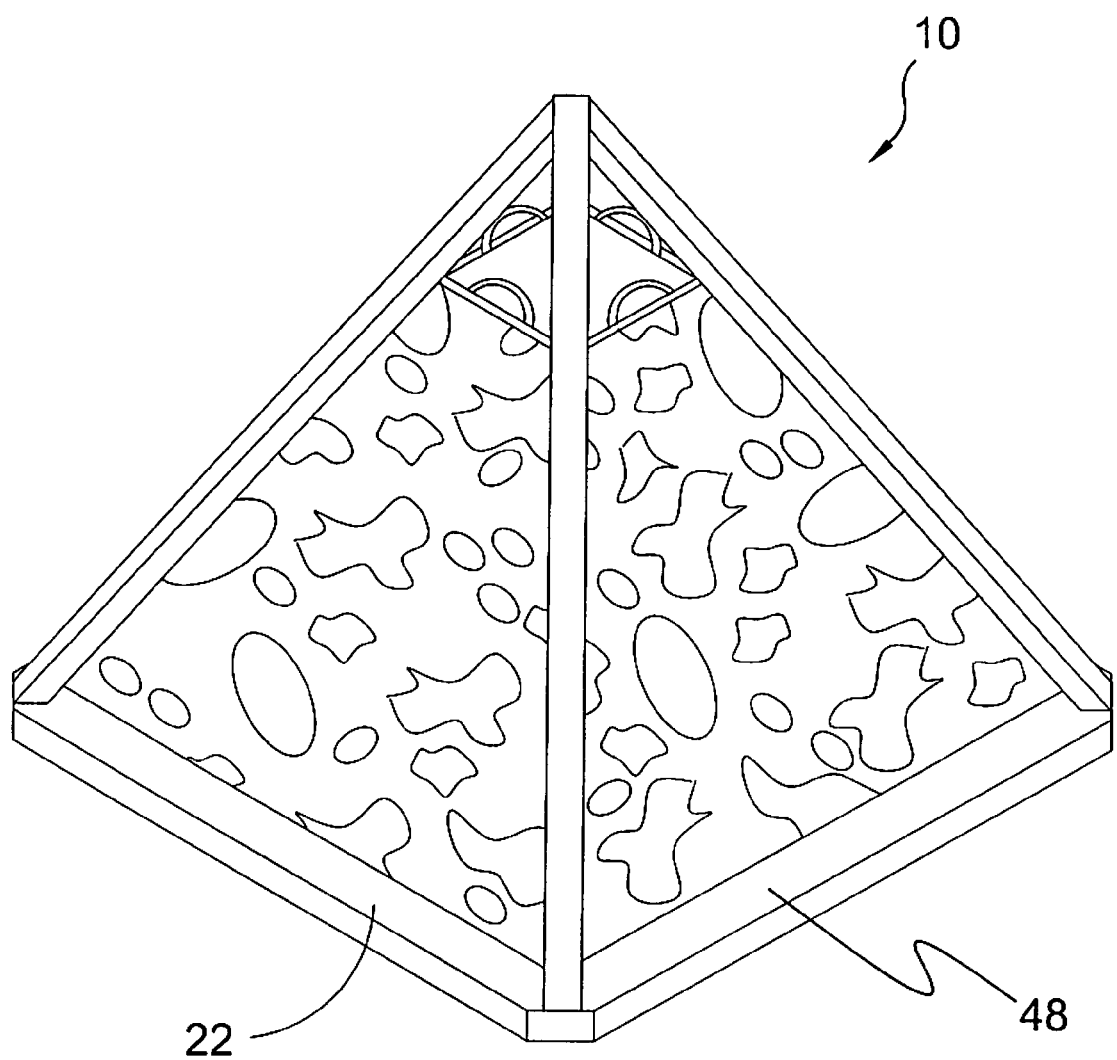
FIG. 6 is a perspective view of an alternate shape of the present invention.

FIG. 6 is a perspective view of an alternate shape of the present invention 10 having a square base 22 and a pyramid shape 48.

Figure 7:
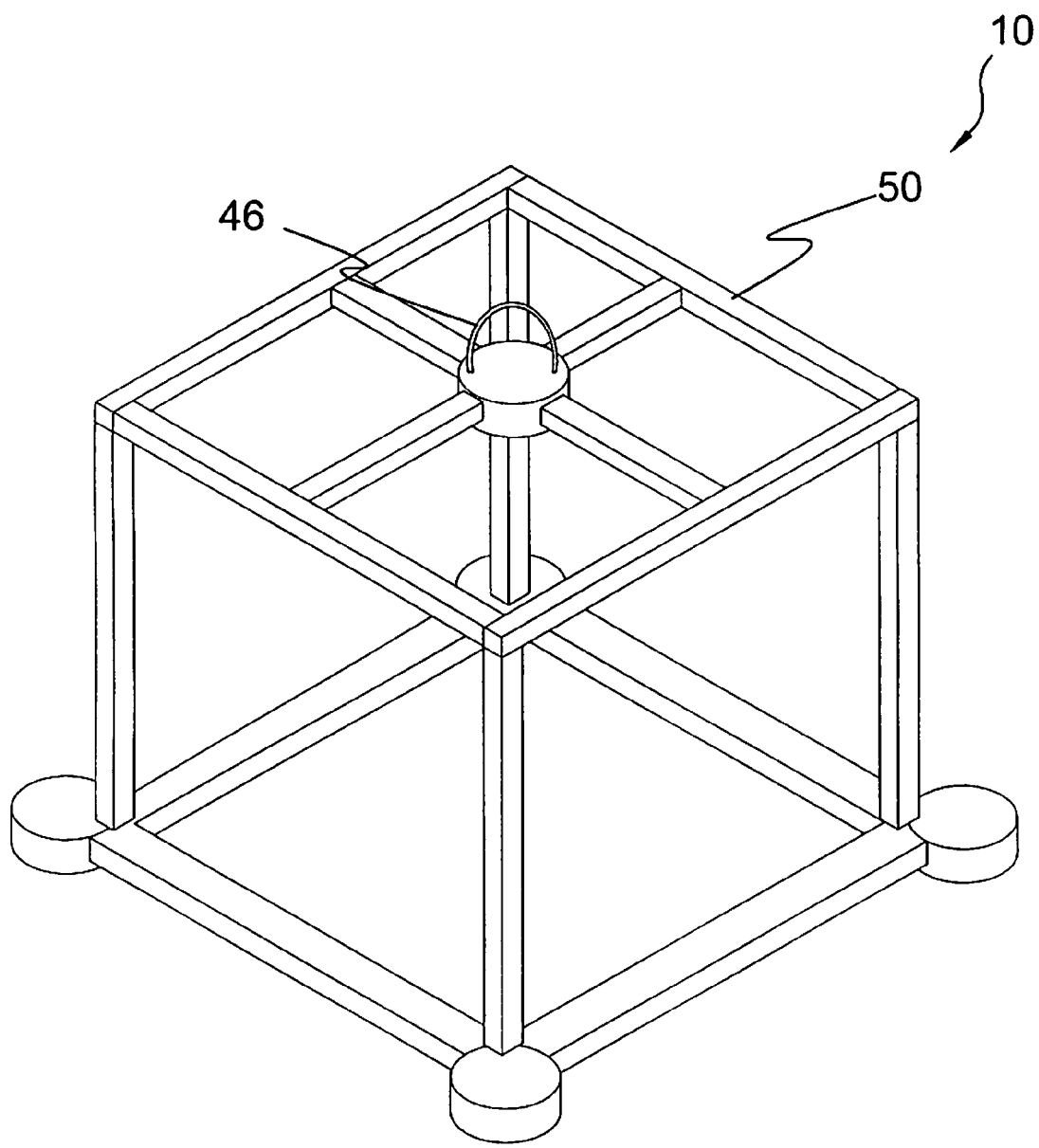
FIG. 7 is a perspective view of an alternate shape of the present invention.

FIG. 7 is a perspective view of an alternate shape of the present invention 10. Shown is the artificial reef 10 fabricated in as a square reef 50 including a hoist bar 46. The benefit of embedding the stone in the concrete is to allow vertical relief from the bottom. This exposes more of the stone for marine life to attach itself to. By using small stones instead of one large stone, much more surface area is exposed for the marine life to attach to. The soft limestone allows marine boring animals (worms) and other marine life forms such as crustaceans to drill into the stone for easy attachment, attracting fish and other marine life to the artificial reef 10.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is:

1. An artificial reef comprising:
   a) a support structure made of a plurality of frame members forming a base and frame members extending up from said base;
   b) walls fabricated of a concrete material secured to said support structure forming a hollow interior, said walls having recesses to provide access into the hollow interior of said reef; and
   c) a plurality of soft stones embedded into said concrete walls, said soft stones are elevated beyond the face of said concrete walls to provide a greater surface area for marine life to bore and anchor into.

2. The artificial reef recited in claim 1, wherein said soft stone is sufficiently soft to allow hosting boring marine life.

3. The artificial reef recited in claim 2, wherein said soft stone is limestone.

4. The artificial reef recited in claim 3, wherein said limestone is coquina.

5. The artificial reef recited in claim 4, wherein said base forms a triangulated footprint.

6. The artificial reef recited in claim 5, wherein said frame members extend from said triangulated base to form a pyramidical shape to provide vertical relief.

7. The artificial reef recited in claim 4, wherein said base forms a square footprint.

8. The artificial reef recited in claim 7, wherein said frame members extend from said square base to form a pyramidical shape to provide vertical relief.

9. The artificial reef recited in claim 7, wherein said frame members extend from said square base to form a square shape to provide vertical relief.

10. The artificial reef recited in claim 4, wherein said base forms a substantially circular footprint.

11. The artificial reef recited in claim 10, wherein said frame members extend from said circular base to form a circular shape to provide vertical relief.

12. The artificial reef recited in claim 4, further including a hoist bar for attaching a hook for lifting and lowering said artificial reef during installation.

\* \* \* \* \*